United States Patent
Kamino et al.

(10) Patent No.: US 11,007,878 B2
(45) Date of Patent: May 18, 2021

(54) ELECTRIC VEHICLE AND CONTROL METHOD THEREOF

(71) Applicant: TOYOTA JIDOSHA KABUSHIKI KAISHA, Toyota (JP)

(72) Inventors: Shinya Kamino, Toyota (JP); Mitsuhiro Toyoda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/667,109

(22) Filed: Oct. 29, 2019

(65) Prior Publication Data

US 2020/0171959 A1 Jun. 4, 2020

(30) Foreign Application Priority Data

Nov. 29, 2018 (JP) .............................. JP2018-223706

(51) Int. Cl.
*B60L 15/00* (2006.01)
*B60L 15/20* (2006.01)
(Continued)

(52) U.S. Cl.
CPC ............ *B60L 15/2009* (2013.01); *B60K 6/26* (2013.01); *B60L 50/51* (2019.02); *B60L 2210/40* (2013.01); *B60L 2240/12* (2013.01); *B60L 2240/423* (2013.01); *B60Y 2200/91* (2013.01); *B60Y 2200/92* (2013.01)

(58) Field of Classification Search
CPC ...... B60L 15/00; B60L 15/2009; B60L 50/00; B60L 50/51; B60L 2210/40; B60L 2440/12; B60Y 2200/91; B60K 6/00; B60K 6/26; B60K 6/36; B60K 6/365; B60K 1/00; B60K 1/02; B60W 10/00; B60W 10/024; B60W 10/04; B60W 10/08; B60W 10/10; B60W 2710/09; B60W 2710/10; B60W 2710/1022; B60W 2710/1027; B60W 20/00; B60W 20/10; F16H 59/00;
(Continued)

(56) References Cited

U.S. PATENT DOCUMENTS 6,546,319 B2 * 4/2003 Yamaguchi ............. F16H 3/727
701/22
6,654,672 B2 * 11/2003 Yamaguchi ............ B60K 6/445
701/22
(Continued)

FOREIGN PATENT DOCUMENTS

| JP | 2009-136092 A | 6/2009 |
| JP | 2016-112906 A | 6/2016 |
| JP | 2016-150667 A | 8/2016 |

*Primary Examiner* — Yonel Beaulieu
(74) *Attorney, Agent, or Firm* — Oliff PLC (57) ABSTRACT

An electric vehicle of the present disclosure includes a first electric motor, a second electric motor and a controller. The first electric motor co-rotates with a wheel when the electric vehicle is driven by only a driving torque from the second electric motor. The controller is programmed to increase or decrease the driving torque from the second electric motor in accordance with a driving state of the electric vehicle so as to shift a vehicle speed out of a predetermined low speed range when the electric vehicle is driven by only the driving torque from the second electric motor and the vehicle speed is included within the low speed range.

7 Claims, 5 Drawing Sheets

(51) Int. Cl.
*B60K 6/26* (2007.10)
*B60L 50/00* (2019.01)
*B60W 10/00* (2006.01)
*B60W 20/00* (2016.01)
*B60L 50/51* (2019.01)

(58) Field of Classification Search
CPC .......... F16H 63/00; Y10S 903/00; B60T 7/00; B60T 7/12; B60T 8/00
See application file for complete search history.

(56) References Cited

U.S. PATENT DOCUMENTS

| | | | |
|---|---|---|---|
| 7,383,115 B2* | 6/2008 | Tabata | B60W 10/115 |
| | | | 701/96 |
| 8,670,911 B2* | 3/2014 | Fukuda | B60T 7/12 |
| | | | 701/70 |
| 2001/0049570 A1* | 12/2001 | Yamaguchi | B60W 10/06 |
| | | | 701/22 |
| 2003/0060948 A1* | 3/2003 | Yamaguchi | B60W 10/10 |
| | | | 701/22 |
| 2006/0064225 A1* | 3/2006 | Tabata | B60L 50/16 |
| | | | 701/96 |

* cited by examiner

ELECTRIC VEHICLE AND CONTROL METHOD THEREOF

CROSS-REFERENCE TO RELATED APPLICATIONS

The present disclosure claims priority to Japanese Patent Application No. 2018-223706 filed on 29 Nov. 2018, which is incorporated herein by reference in its entirety including specification, drawings and claims.

TECHNICAL FIELD

The present disclosure relates to an electric vehicle that includes a first electric motor and a second electric motor, and to a control method thereof.

BACKGROUND

A conventionally known hybrid vehicle includes an engine, a first motor, a power split device that distributes power from the engine between a first motor side and an output shaft side, and a second motor coupled to the output shaft (as described in, for example, JP 2016-150667A). A controller of the hybrid vehicle executes a first, second and third control in turn when the hybrid vehicle is driven by power from the second motor while an operation of the engine is stopped, and a rotation speed of the first motor that co-rotates with a rotating element of the power split device (wheel) decreases to a predetermined rotation speed. The first control energizes the first motor such that the rotation speed of the first motor becomes higher than a predetermined rotation speed in a rotational direction of the second motor. The second control corrects a torque from the second motor in accordance with an increase in the rotation speed of the first motor by the first control. The third control sets the rotation speed of the first motor to zero after the hybrid vehicle stops. The above predetermined rotation speed is set to a resonant rotation speed or a rotation speed close thereto in order to reduce vibration (resonance) and/or noise such as rattle noise due to a cogging torque (reaction torque) of the first motor.

SUMMARY

However, when the rotation speed of the first motor is increased so as to suppress the resonance and/or the noise as in the above-described conventional hybrid vehicle, the engine is rotated by the torque from the first motor, such that another resonance and/or noise may occur due to vibration from the output shaft of the engine.

A main object of the present disclosure is to favorably suppress an appearance of resonance and/or noise due to the cogging torque of the first electric motor that co-rotates with the wheel when the electric vehicle is driven by only a driving torque from the second electric motor.

An electric vehicle of the present disclosure includes a first electric motor and a second electric motor, the first electric motor co-rotating with a wheel when the electric vehicle is driven by only a driving torque from the second electric motor. The electric vehicle includes a controller programmed to increase or decrease the driving torque from the second electric motor in accordance with a driving state of the electric vehicle so as to shift a vehicle speed out of a predetermined low speed range when the electric vehicle is driven by only the driving torque from the second electric motor and the vehicle speed is included within the low speed range.

DESCRIPTION OF EMBODIMENTS

The following describes some embodiments of the disclosure with reference to drawings.

Figure 1:
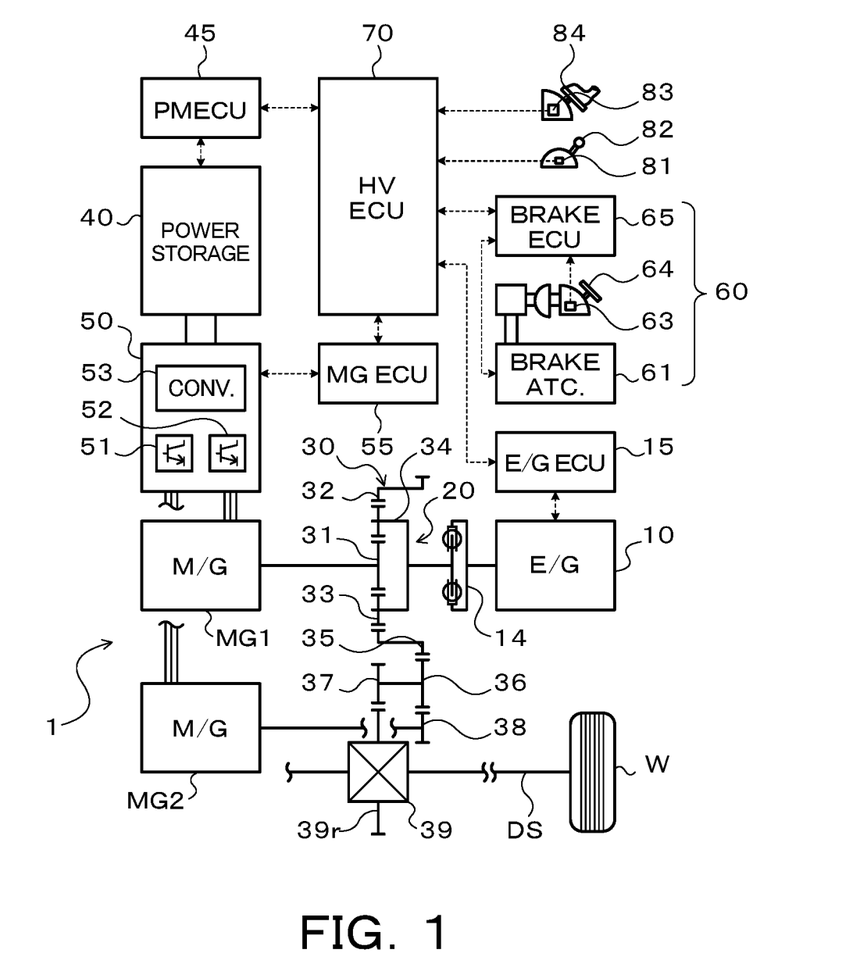
FIG. 1 is a schematic configuration diagram illustrating the electric vehicle according to the present disclosure.

FIG. 1 is a schematic configuration diagram illustrating a hybrid vehicle 1 or the electric vehicle according to the present disclosure. The hybrid vehicle 1 shown in FIG. 1 includes an engine 10, a single pinion planetary gear 30, motor generators MG1 and MG2 respectively configured as a synchronous motor generator (three-phase AC motor), a power storage device (battery) 40, a power control unit (hereinafter referred to as "PCU") 50 connected with the power storage device 40 and configured to drive the motor generators MG1 and MG2, an electronic control hydraulic braking device 60 capable of applying a friction braking force to wheels W, and a hybrid electronic control unit (hereinafter referred to as "HVECU") 70 configured to control the entire vehicle.

The engine 10 is an internal combustion engine configured to generate power by explosive combustion of a mixture of a hydrocarbon fuel such as gasoline, light oil, liquefied petroleum gas or the like and the air. The engine 10 is controlled by an engine electronic control unit (hereinafter referred to as "engine ECU") 15 that includes a microcomputer with a CPU and the like (not shown).

The planetary gear 30 is a differential rotation mechanism that includes a sun gear (first element) 31, a ring gear (second element) 32, and a planet carrier (third element) 34 that rotatably supports a plurality of pinion gears 33. The sun gear 31 is coupled to a rotor of the motor generator MG1. The planet carrier 34 is coupled to a crankshaft (output shaft) of the engine 10 via a damper mechanism 14. The ring gear 32 is integral with a counter drive gear 35 or an output member and coaxially and integrally rotates with the counter drive gear 35.

The counter drive gear 35 is coupled to left and right wheels W (drive wheels) via a counter driven gear 36 that meshes with the counter drive gear 35, a final drive gear (drive pinion gear) 37 that integrally rotates with the counter driven gear 36, a final driven gear (differential ring gear) 39r that meshes with the final drive gear 37, a differential gear 39 and drive shafts DS. The planetary gear 30, a gear train from the counter drive gear 35 to the final driven gear 39r and the differential gear 39 constitute a transaxle 20 that couples the engine 10 and the motor generator MG1 to the wheels W and couples the engine 10 and the motor generator MG1 to each other.

A drive gear 38 is fixed to a rotor of the motor generator MG2. The drive gear 38 has a smaller number of teeth than the counter driven gear 36 and meshes with the counter driven gear 36. Thus, motor generator MG2 is coupled to left and right wheels W (drive wheels) via the drive gear 38, the counter driven gear 36, the final drive gear 37, the final driven gear 39r, the differential gear 39, and the drive shafts DS.

The motor generator MG1 (first electric motor) is mainly operated as a generator that generates electric power with at least a part of the power from the engine 10 under load operation. The motor generator MG2 (second electric motor) is mainly driven by at least one of the electric power from the power storage device 40 and the electric power from the motor generator MG1 so as to operate as an electric motor that generates a driving torque and outputs a regenerative braking torque when braking the hybrid vehicle 1. The motor generators MG1 and MG2 are capable of exchanging the electric power with the power storage device 40 via the PCU 50 and exchanging the electric power with each other via the PCU 50.

The power storage device 40 is, for example, a lithium ion secondary battery or a nickel hydrogen secondary battery, and is managed by a power management electronic control unit (hereinafter referred to as "power management ECU") 45 that includes a microcomputer with a CPU and the like (not shown). The power management ECU 45 derives SOC (charging rate), an allowable charging power Win, an allowable discharging power Wout and the like of the storage device 40 based on an inter-terminal voltage VB from a voltage sensor of the power storage device 40, a charging/discharging current IB from a current sensor, a battery temperature Tb from a temperature sensor, and the like. The hybrid vehicle 1 may be configured as a plug-in hybrid vehicle in which the power storage device 40 is chargeable with electric power from an external power supply that is a household power supply, a quick charger installed on a stand, or the like.

The PCU 50 includes a first inverter 51 configured to drive the motor generator MG1, a second inverter 52 configured to drive the motor generator MG2, a boost converter (voltage conversion module) 53 capable of boosting the electric power from power storage device 40 and stepping down the electric power from the side of motor generators MG1 and MG2, and the like. The PCU 50 is controlled by a motor electronic control unit (hereinafter referred to as "MGECU") 55 including a microcomputer with a CPU and the like (not shown). The MGECU 55 acquires command signals from the HVECU 70, a pre-boost voltage and a post-boost voltage of the boost converter 53, detected values of resolvers (not shown) that detects rotational positions of rotors of the motor generators MG1 or MG2, phase currents applied to the motor generators MG1 and MG2, and the like. MGECU 55 performs switching control of the first and second inverters 51 and 52 and boost converter 53 based on these signals. Further, MGECU 55 calculates rotation speeds Nm1 and Nm2 of the rotors of motor generators MG1 and MG2 based on the detection values of the resolvers.

The hydraulic braking device 60 includes a master cylinder, a plurality of brake pads respectively pressed against a corresponding brake disc attached to each wheel W so as to apply a braking torque (friction braking torque) to the corresponding wheel W, a plurality of wheel cylinders respectively driving the corresponding brake pad (all not shown), a hydraulic brake actuator 61 that supplies hydraulic pressure to each of the wheel cylinders, a brake electronic control unit (hereinafter referred to as a "brake ECU") 65 that controls the brake actuator 61, and the like. The brake ECU 65 includes a microcomputer with a CPU and the like (not shown). The brake ECU 65 acquires command signals from the HVECU 70, a brake pedal stroke BS (depressed amount of the brake pedal 64) detected by a brake pedal stroke sensor 63, a vehicle speed detected by a vehicle speed sensor (not shown) and the like, and controls the brake actuator 61 based on these signals.

The HVECU 70 includes a microcomputer with a CPU, a ROM, a RAM, an input/output device and the like (not shown). The HVECU 70 mutually exchanges information (communication frame) with the ECUs 15, 45, 55, 65 and the like via a common communication line (multiplex communication bus, not shown) which is a CAN bus including two communication lines (wire harnesses) of Lo and Hi. Further, the HVECU 70 is individually connected with each of the ECUs 15, 45, 55 and 65 via a dedicated communication line (local communication bus) which is a CAN bus including two communication lines (wire harnesses) of Lo and Hi. The HVECU 70 mutually exchanges information (communication frame) with each of the ECUs 15, 45, 55 and 65 via the corresponding dedicated communication line. Furthermore the HVECU 70 acquires, for example, a signal from a start switch (not shown) for instructing a system activation of the hybrid vehicle 1, a shift position SP of a shift lever 82 detected by a shift position sensor 81, an accelerator opening Acc (depressed amount of an accelerator pedal 84) detected by an accelerator pedal position sensor 83, the vehicle speed detected by the vehicle speed sensor (not shown), the rotation speeds Nm1 and Nm2 of the motor generators MG1 and MG2 from the MGECU 55, and the like.

Figure 2:
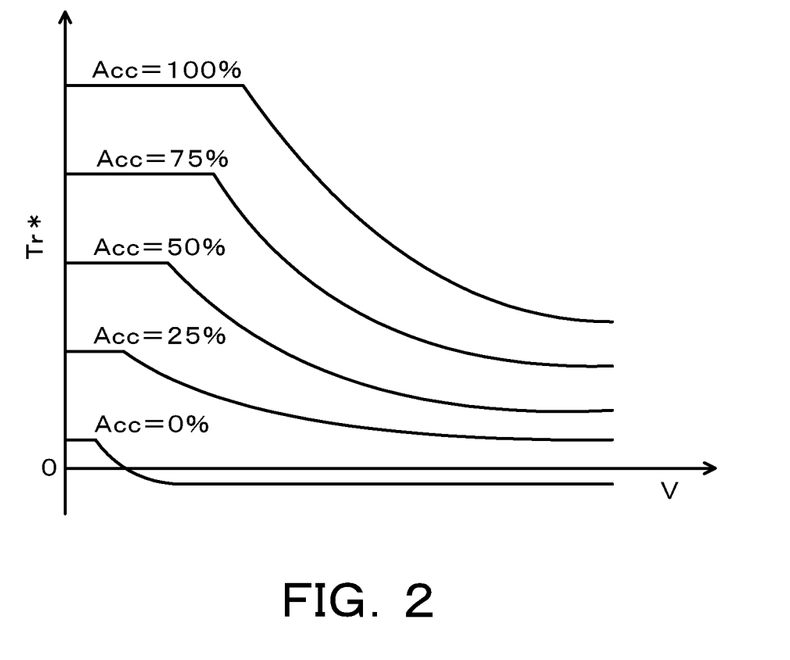
FIG. 2 is an explanation view exemplifying a required torque setting map used in the electric vehicle according to the present disclosure.

The HVECU 70 derives a required torque Tr* (including a required braking torque) to be output to the drive shafts DS corresponding to the accelerator opening Acc and the vehicle speed from a required torque setting map shown in FIG. 2 when the hybrid vehicle 1 is driven, and sets a required driving power Pd* required for driving the hybrid vehicle 1 based on the required torque Tr* and a rotation speed Nds of the drive shafts DS. Further, the HVECU 70 determines whether or not the load operation of the engine 10 is to be executed based on the required torque Tr*, the required driving power Pd*, a target charging/discharging power Pb* and the allowable discharging power Wout of the storage device 40, and the like. When the load operation of the engine 10 is executed, the HVECU 70 sets a target power Pe* of the engine 10 based on the required driving power Pd* and the separately set target charging/discharging power Pb* of the storage device 40 such that the engine 10 is efficiently operated, and sets a target rotation speed Ne* of the engine 10 corresponding to the target power Pe*. Further, the HVECU 70 sets torque commands Tm1* and Tm2* for motor generators MG1 and MG2 corresponding to the required torque Tr*, the target rotation speed Ne* and the like. On the other hand, when stopping the operation of engine 10, the HVECU 70 sets the target power Pe*, the target rotation speed Ne* and the torque command Tm1* to value 0, and sets the torque command Tm2* such that the motor generator MG2 outputs a torque corresponding to the required torque Tr* to the drive shafts DS.

Then, the HVECU 70 sends the target power Pe* and the target rotation speed Ne* to the engine ECU 15, and sends the torque commands Tm1* and Tm2* to the MGECU 55. The engine ECU 15 executes an intake air amount control, a fuel injection control, an ignition timing control and the like based on the target power Pe* and the target rotation speed Ne*. The MGECU 55 executes switching control of the first and second inverters 51 and 52 and the boost converter 53 based on the torque commands Tm1* and Tm2*. When the load operation of the engine 10 is executed, the motor generators MG1 and MG2 are controlled so as to perform a torque conversion of a part (at the time of charging) or all (at the time of discharging) of the power output from engine 10 together with planetary gear 30 and output it to the drive shafts DS. Thus, the hybrid vehicle 1 is driven by the power (direct torque) from the engine 10 and the power from the motor generator MG2 (HV drive). On the other hand, when the operation of the engine 10 is stopped, the hybrid vehicle 1 is driven by only the power from the motor generator MG2 (EV drive). When a driver releases a depression of the accelerator pedal 84, the required torque Tr* corresponding to the accelerator opening 0% and the vehicle speed is derived from the required torque setting map of FIG. 2. Then, the motor generator MG2 outputs a creep torque (drive torque) corresponding to the required torque Tr* to the drive shafts DS.

Figure 3:
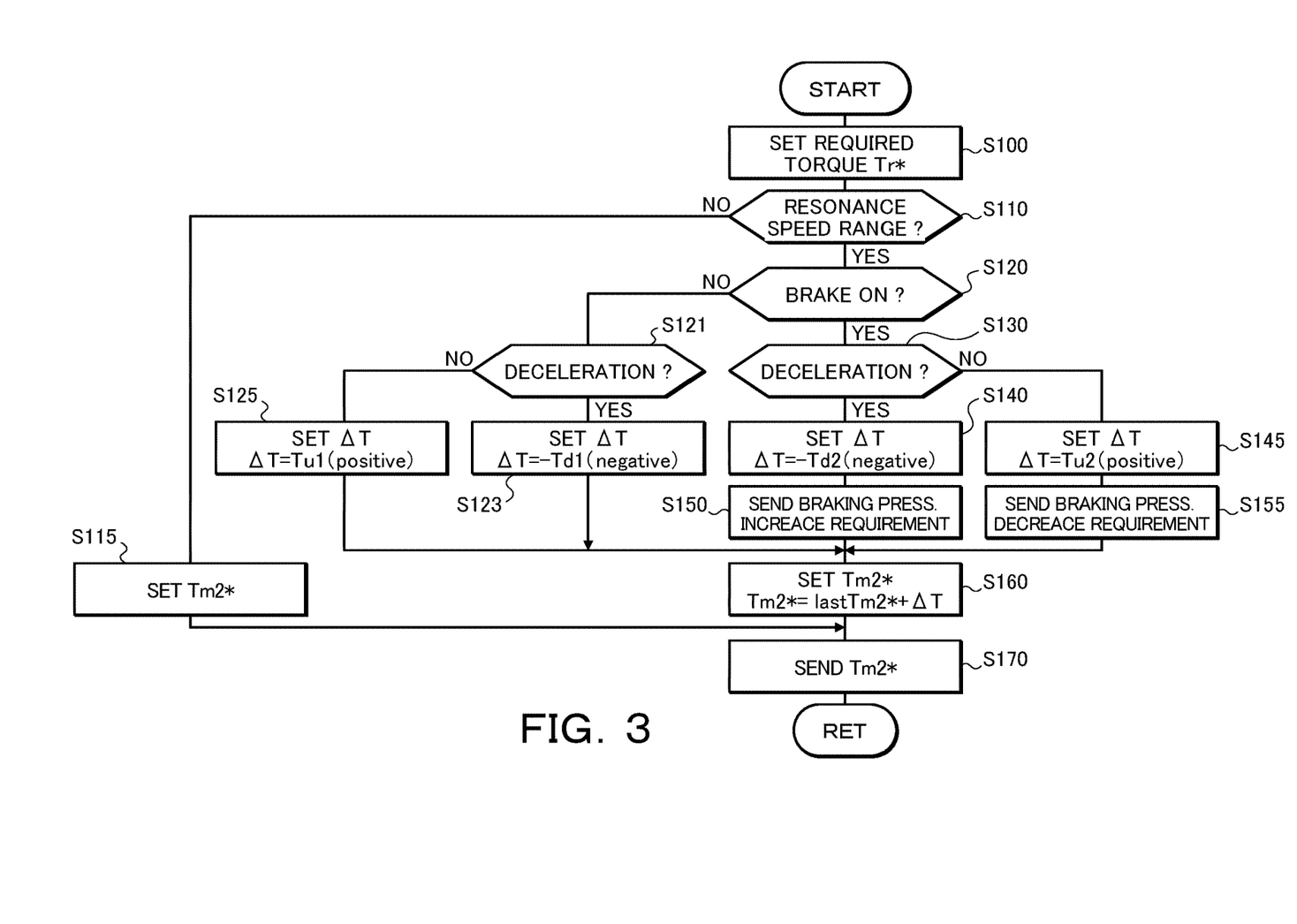
FIG. 3 is a flowchart exemplifying an EV drive control routine executed in the electric vehicle according to the present disclosure.

The following describes a control procedure of the hybrid vehicle 1 advanced or reversed at low speed by only the driving torque from the motor generator MG2 with reference to FIG. 3 and the like.

FIG. 3 is a flow chart showing an example of an EV drive control routine executed by the HVECU 70 at short time intervals. The routine of FIG. 3 is executed, for example, when the driver releases the depression of the accelerator pedal 84 and the hybrid vehicle 1 is driven by the driving torque (creep torque) from the motor generator MG2 at low speed or when the driver gently depresses the accelerator pedal 84 and the hybrid vehicle 1 is driven by the driving torque (creep torque) from the motor generator MG2 at low speed on an uphill road, and the like. When the hybrid vehicle 1 is driven by the driving torque from the motor generator MG2 while the driver depresses the brake pedal 64, the hydraulic braking device 60 applies the braking torque to each of the wheels W.

When a start timing of the EV drive control routine arrives, the HVECU 70 acquires various data necessary for an execution of the routine, and derives (sets) the required torque Tr* corresponding to the accelerator opening Acc and the vehicle speed from the required torque setting map shown in FIG. 2 (Step S100). Then the HVECU 70 determines whether or not the vehicle speed of the hybrid vehicle 1 is included within a predetermined resonance speed range (low speed range) based on the rotation speed Nm2 of the motor generator MG2 (Step S110).

Here, in the hybrid vehicle 1 of the present disclosure, the motor generator MG1 does not output any torque and co-rotates with the wheels W via the drive shafts DS, the differential gear 39, the gear train from the counter drive gear 35 to the final driven gear 39r and the planetary gear 30 when the hybrid vehicle 1 is driven by only the driving torque from the motor generator MG2. Further, components of the damper mechanism 14 and/or the drive shafts DS resonate with vibration due to a cogging torque of the non-excited motor generator MG1 when the hybrid vehicle 1 is driven by only the driving torque from the motor generator MG2 at a very low speed equal to or less than 1 km/h, for example. When a resonance occurs and the cogging torque crosses zero, rattle noise (noise) may occur in a meshing portion between the counter drive gear 35 and the counter driven gear 36 and the like, for example.

Based on this, in the hybrid vehicle 1, a speed range in which the resonance and/or the noise may occur due to the cogging torque of the motor generator MG1 is defined by experiment, analysis and the like as the resonance speed range from 0 km/h to 1 km/h, for example. Further, an upper and lower limit of the resonance speed range are converted into the rotation speed of the motor generators MG2 so as to predetermine an upper threshold (for example, 20 rpm) and a lower threshold (for example, 50 rpm) that are compared with the rotation speed Nm2 of the motor generator MG2. In Step S110, the HVECU 70 compares the rotation speed Nm2 of the motor generator MG2 calculated by the MGECU 55 with the upper and the lower thresholds and determines whether or not the vehicle speed of the hybrid vehicle 1 is included within the resonance speed range.

When determining that the vehicle speed is not included within the resonance speed range (Step S110: NO), the HVECU 70 sets the torque command Tm2* such that the motor generator MG2 outputs the torque corresponding to the required torque Tr* set in Step S100 to the drive shafts DS (Step S115). Then, the HVECU 70 sends the set torque command Tm2* (and torque command Tm1*=0) to the MGECU 55 (Step S170) and once terminates the routine. The MGECU 55 receives the torque command Tm2* and controls the PCU 50 based on the torque command Tm2* and the like.

When determining that the vehicle speed is included within the resonance speed range (Step S110: YES), the HVECU 70 determines whether or not the driver depresses the brake pedal 64 (Step S120). When determining that the driver does not depress the brake pedal 64 (Step S120: NO), the HVECU 70 determines whether or not the hybrid vehicle 1 is decelerated (Step S121). When determining that the hybrid vehicle 1 is decelerated (Step S121: YES), the HVECU 70 sets a changing rate ΔT that is a changing amount (decrease amount) per unit time (execution cycle of the routine) of the driving torque output from the motor generator MG2 to a value −Td1 (negative value) predetermined by experiment and analysis (Step S123). When determining that the hybrid vehicle 1 is not decelerated and gently accelerated or driven at a constant speed (Step S121: NO), the HVECU 70 sets the changing rate ΔT of the driving torque output from the motor generator MG2 to a value Tu1 (positive value) predetermined by experiment and analysis (Step S125).

On the other hand, when determining that the driver depresses the brake pedal 64 and the hydraulic braking device 60 applies the braking torque to each of the wheels W (Step S120: YES), the HVECU 70 determines whether or not the hybrid vehicle 1 is decelerated (Step S130). When determining that the hybrid vehicle 1 is decelerated (Step S130: YES), the HVECU 70 sets the changing rate ΔT of the driving torque output from the motor generator MG2 to a value −Td2 (negative value) predetermined by experiment and analysis (Step S140). The value −Td2 may be a smaller value (larger in absolute value) than the above value −Td1 or a value identical to the value −Td1. Further, the HVECU 70 sends a braking pressure increase requirement to the brake ECU 65 in order to increase the braking torque from the hydraulic braking device 60 (Step S150). The brake ECU 65 receives the braking pressure increase requirement and increases the hydraulic pressure supplied to each of the wheel cylinders from the brake actuator 61 to a predetermined constant value, for example, so as to increase the braking torque applied to each of the wheels W.

When determining that the hybrid vehicle 1 is not decelerated and gently accelerated or driven at a constant speed (Step S130: NO), the HVECU 70 sets the changing rate ΔT of the driving torque output from the motor generator MG2 to a value Tu2 (positive value) predetermined by experiment and analysis (Step S145). The value Tu2 may be a larger value than the above value Tu1 or a value identical to the value Tu1. Further, the HVECU 70 sends a braking pressure decrease requirement to the brake ECU 65 in order to decrease the braking torque from the hydraulic braking device 60 (Step S155). The brake ECU 65 receives the braking pressure decrease requirement and decreases the hydraulic pressure supplied to each of the wheel cylinders from the brake actuator 61 to a predetermined constant value, for example, so as to decrease the braking torque applied to each of the wheels W.

After the process of Step S123, S125, S150 or S155, the HVECU 70 sets the torque command Tm2* of the motor generator MG2 to a sum of the torque command Tm2* set during a last execution of the routine (last value) and the changing rate ΔT set in Step S123, S125, S140 or S145 without using the required torque Tr* set in Step S100 (Step S160). Then, the HVECU 70 sends the set torque command Tm2* (and torque command Tm1*=0) to the MGECU 55 (Step S170) and once terminates the routine. The MGECU 55 receives the torque command Tm2* and controls the PCU 50 based on the torque command Tm2* and the like.

As a result of repeated execution of the above routine of FIG. 3, the driving torque from the motor generator MG2 is increased or decreased in accordance with a driving state of the hybrid vehicle 1 so as to shift the vehicle speed out of the resonance speed range when the hybrid vehicle 1 is driven by only the driving torque from the motor generator MG2 and the vehicle speed is included within the resonance speed range. That is, above processes of Steps S125, S160-S170 are repeatedly executed so as to gradually increase the driving torque of the motor generator MG2 when the vehicle speed is included within the resonance speed range and the hybrid vehicle 1 is not decelerated and gently accelerated or driven at the constant speed by the driving torque from the motor generator MG2 while the driver does not depress the brake pedal 64 (Step S120 NO, Step S121: NO).

Figure 4:
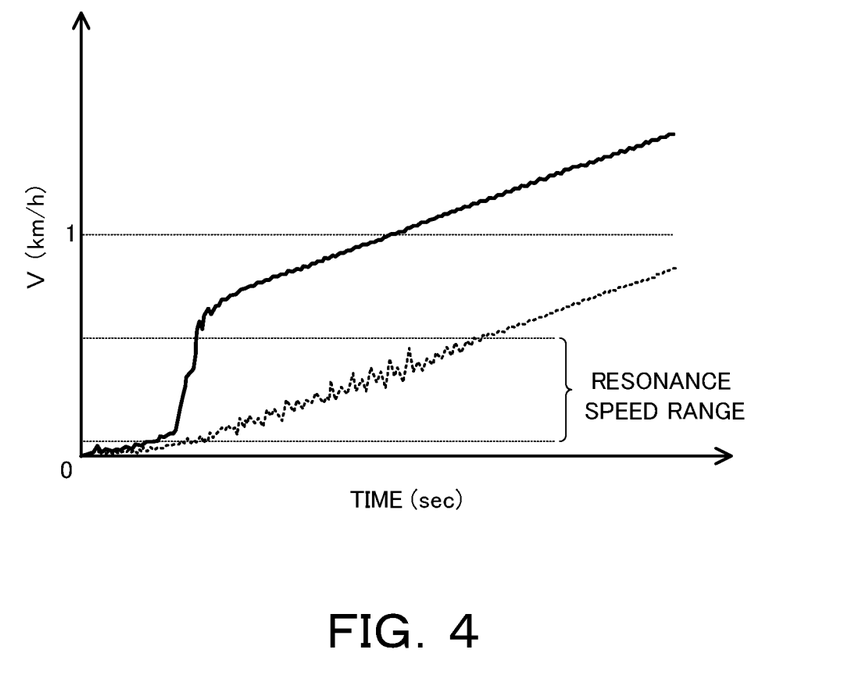
FIG. 4 is a graph exemplifying a change of a vehicle speed when the routine of FIG. 3 is executed.

Thus, as shown by a solid line in FIG. 4, the vehicle speed is relatively steeply increased so as to be shifted out of the resonance speed range compared to when the above processes are not executed (see a dotted line in FIG. 4). This suppresses an occurrence and a continuation of the resonance in a portion of a drive system (transaxle 20) connected to the motor generator MG1, that is, in a spline engagement portion near the planetary gear 30 so as to favorably decrease rattle noise in the gear train including the counter drive gear 35. Further, since the vehicle speed in the resonance speed range is extremely low, an occupant of the hybrid vehicle 1 may not feel discomfort due to a change in a feeling of acceleration when the vehicle speed is relatively steeply increased in the resonance speed range. Accordingly, an appearance of the resonance and/or the noise due to the cogging torque of the motor generator MG1 that co-rotates with the wheels W is favorably suppressed while decreasing discomfort to the occupant due to the change in the feeling of acceleration when the hybrid vehicle 1 is driven by only the driving torque from the motor generator MG2.

When the vehicle speed is included within the resonance speed range and the hybrid vehicle 1 is decelerated while the driver does not depress the brake pedal 64 and the driving torque is output from the motor generator MG2 (Step S120 NO, Step S121: YES), above processes of Steps S123, S160-S170 are repeatedly executed so as to gradually decrease the driving torque of the motor generator MG2. Thus, the vehicle speed is relatively steeply decreased so as to be shifted out of the resonance speed range compared to when the above processes are not executed. This suppresses the occurrence and the continuation of the resonance in the portion of the drive system (transaxle 20) connected to the motor generator MG1 so as to favorably decrease rattle noise near the counter drive gear 35 and the like. Further, since the vehicle speed in the resonance speed range is extremely low, the occupant of the electric vehicle may not feel discomfort due to a change in the feeling of deceleration when the vehicle speed is relatively steeply decreased in the resonance speed range. Accordingly, the appearance of the resonance and/or the noise due to the cogging torque of the motor generator MG1 that co-rotates with the wheels W is favorably suppressed while decreasing discomfort to the occupant due to the change in the feeling of deceleration when the hybrid vehicle 1 is driven by only the driving torque from the motor generator MG2.

Further, above processes of Steps S145, S155, S160-S170 are repeatedly executed when the vehicle speed is included within the resonance speed range and the hybrid vehicle 1 is gently accelerated or driven at a constant speed while the driving torque is output from the motor generator MG2 and the driver depresses the brake pedal 64 (Step S130: NO). In this case, the motor generator MG2 is controlled so as to gradually increase the driving torque and the brake actuator 61 of the hydraulic braking device 60 is controlled so as to decrease the braking torque. Thus, the vehicle speed is increased so as to be shifted out of the resonance speed range, such that the occurrence and the continuation of the resonance is suppressed while decreasing discomfort to the occupant due to the change in the feeling of accelerations. In addition, the hydraulic braking device 60 is controlled to decrease the braking torque. This suppresses the vehicle speed from remaining in the resonance speed range despite the driving torque from the motor generator MG2 is increased.

When the vehicle speed is included within the resonance speed range and the hybrid vehicle 1 is decelerated while the driving torque is output from the motor generator MG2 and the driver depresses the brake pedal 64 (Step S130: YES), above processes of Steps S140, S150, S160-S170 are repeatedly executed. In this case, the motor generator MG2 is controlled so as to gradually decrease the driving torque and the brake actuator 61 of the hydraulic braking device 60 is controlled so as to increase the braking torque. Thus, the vehicle speed is decreased so as to be shifted out of the resonance speed range, such that the occurrence and the continuation of the resonance is suppressed while decreasing discomfort to the occupant due to the change in the feeling of deceleration. In addition, the hydraulic braking device 60 is controlled to increase the braking torque. This suppresses the vehicle speed from remaining in the resonance speed range despite the driving torque from the motor generator MG2 is decreased.

In the present embodiment, the resonance speed range is defined within the range from 0 km/h to 1 km/h. That is, the invention of the present disclosure is advantageous to vehicles in which the resonance and/or the noise due to the cogging torque of the motor generator MG1 may occur in the very low speed range. In some vehicles, the resonance and/or the noise due to the cogging torque of the motor generator MG1 may occur in a speed range from from 0 km/h to 2-3 km/h. In such a case, the resonance speed range may be defined within a range from 0 km/h to 2 km/h or a range from 0 km/h to 3 km/h.

Figure 5:
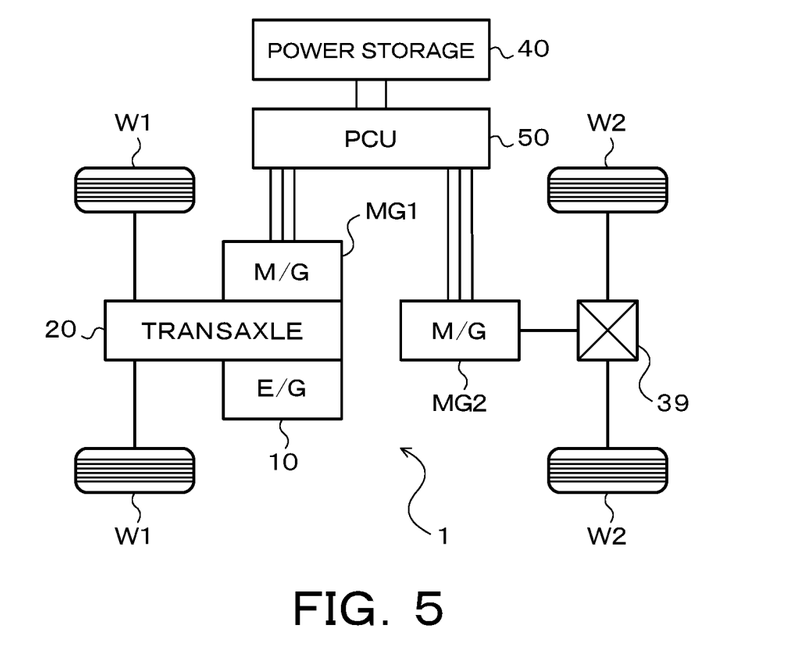
FIG. 5 is a schematic configuration diagram illustrating another electric vehicle according to the present disclosure.

In the hybrid vehicle 1, the motor generator MG2 may be coupled to the ring gear 32 (counter drive gear 35) via a reduction gear, a transmission, or the like. Further, as shown in FIG. 5, the motor generator MG2 may be coupled to wheels W2 different from the wheels W1 with which the motor generator MG1 co-rotates in the hybrid vehicle 1. In this configuration, the transaxle 20 connected to the crankshaft of engine 10, the motor generator MG1 and the wheels W1 may include a stepped transmission, a continuously variable transmission, a dual clutch transmission, or the like. Furthermore, the motor generator MG1 may be coupled to the sun gear 31 of the planetary gear 30, the output member may be coupled to the ring gear 32, and the engine 10 and motor generator MG2 may be coupled to the planet carrier 34. Further, in the hybrid vehicle 1, the planetary gear 30 may be replaced by a four-element compound planetary gear mechanism including two planetary gears. In this configuration, the engine 10 may be coupled to an input element of the compound planetary gear mechanism, the output member may be coupled to an output element, the motor generator MG1 may be coupled to one of residual two rotating elements, and the motor generator MG2 may be coupled to the other. Furthermore, the compound planetary gear mechanism may be provided with a clutch that connects any two of the four rotating elements and a brake capable of fixing any one of them in a non-rotatable manner.

Figure 6:
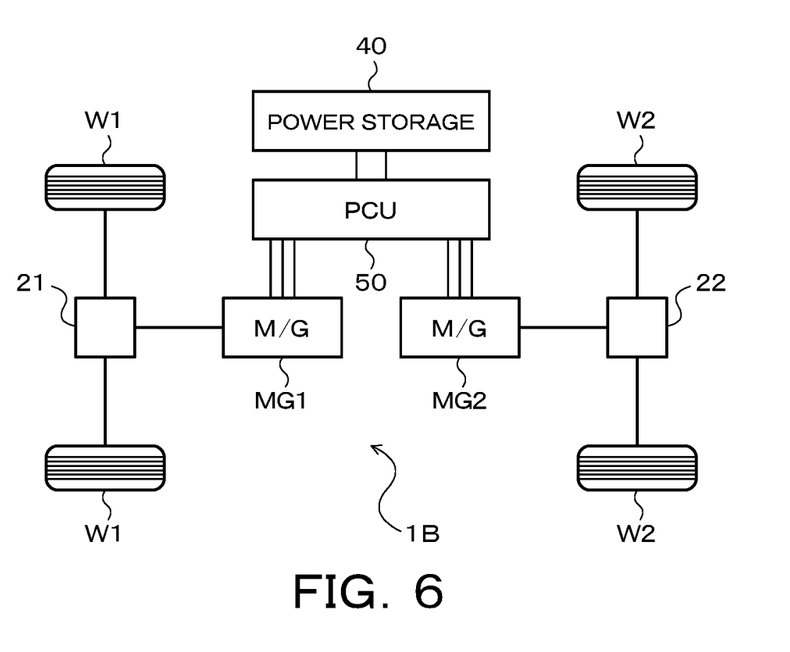
FIG. 6 is a schematic configuration diagram illustrating yet another electric vehicle according to the present disclosure.

FIG. 6 is a schematic configuration diagram illustrating another electric vehicle 1B according to the present disclosure. The electric vehicle 1B shown in FIG. 6 is configured to include the motor generators MG1 and MG2, a first transaxle 21 that includes a reduction mechanism, differential gear and the like and is coupled to the motor generator MG1 and a corresponding pair of the wheels W1, and a second transaxle 22 that includes a reduction mechanism, differential gear and the like and is coupled to the motor generator MG2 and a corresponding pair of the wheels W2. In the electric vehicle 1B, an execution of the EV drive control routine of FIG. 3 suppresses an occurrence and a continuation of resonance in the first transaxle 21 and the like so as to favorably decrease rattle noise in a gear train of the first transaxle 21 and the like while decreasing discomfort to the occupant due to the change in the feeling of acceleration or deceleration when the electric vehicle 1B is driven by only the driving torque from the motor generator MG2. Accordingly, an appearance of the resonance and/or the noise due to the cogging torque of the motor generator MG1 that co-rotates with the wheels W1 is favorably suppressed when the electric vehicle 1 is driven by only the driving torque from the motor generator MG2. In the electric vehicle 1B, at least one of the motor generators MG1 and MG2 may be replaced by two in-wheel motors respectively disposed in a hub of the corresponding wheel W1 or W2.

The above vehicles 1, 1B or the electric vehicles of the present disclosure is configured to include the motor generators MG1 and MG2. The motor generator MG1 co-rotates with the wheel W, W1 when the vehicle 1, 1B is driven by only the driving torque from the motor generator MG2. Further, the HVECU 70 and MGECU 55 or the controller increases or decreases the driving torque from the motor generator MG2 in accordance with the driving state of the vehicle 1, 1B so as to shift the vehicle speed out of the predetermined resonance speed range when the vehicle 1, 1B is driven by only the driving torque from the motor generator MG2 and the vehicle speed is included within the resonance speed range. Accordingly, the appearance of the resonance and/or the noise due to the cogging torque of the motor generator MG1 that co-rotates with the wheel W, W1 is favorably suppressed when the vehicle 1, 1B is driven by only a driving torque from the driving torque from the motor generator MG2.

As has been described above, an electric vehicle of the present disclosure includes a first electric motor and a second electric motor, the first electric motor co-rotating with a wheel when the electric vehicle is driven by only a driving torque from the second electric motor. The electric vehicle includes a controller programmed to increase or decrease the driving torque from the second electric motor in accordance with a driving state of the electric vehicle so as to shift a vehicle speed out of a predetermined low speed range when the electric vehicle is driven by only the driving torque from the second electric motor and the vehicle speed is included within the low speed range.

In the electric vehicle of the present disclosure, the driving torque from the second electric motor is increased or decreased in accordance with the driving state of the electric vehicle so as to shift the vehicle speed out of the predetermined low speed range when the electric vehicle is driven by only the driving torque from the second electric motor and the vehicle speed is included within the low speed range. Thus, when a portion of a drive system connected to the first motor may resonate with vibration due to a cogging torque of the first electric motor co-rotating with the wheel in the low speed range, the vehicle speed is quickly shifted out of the low speed range so as to suppress an occurrence and a continuation of resonance while decreasing discomfort to an occupant of the electric vehicle due to a change in a feeling of acceleration or deceleration. Accordingly, an appearance of the resonance and/or noise due to the cogging torque of the first electric motor that co-rotates with the wheel is favorably suppressed when the electric vehicle is driven by only the driving torque from the second electric motor.

The low speed range may be a speed range in which the resonance due to the cogging torque of the first electric motor becomes apparent. The low speed range may be defined within a range from 0 km/h to 1 km/h. That is, the invention of the present disclosure is advantageous to the electric vehicle in which the resonance and/or the noise due to the cogging torque of the first electric motor may occur in the very low speed range.

The controller may be programmed to gradually increase the driving torque from the second electric motor when the electric vehicle is driven by only the driving torque from the second electric motor without decelerating and the vehicle speed is included within the low speed range. Thus, the vehicle speed is increased so as to be shifted out of the low speed range, such that the occurrence and the continuation of the resonance is suppressed while decreasing discomfort to the occupant of the electric vehicle due to the change in the feeling of acceleration.

The electric vehicle may further includes a braking device that generates a braking force. The controller may be programmed to decrease the braking force from the braking device when the vehicle speed is included within the low speed range and the electric vehicle is driven by only the driving torque from the second electric motor without decelerating while a brake pedal is depressed by a driver. This favorably suppresses the vehicle speed from remaining in the low vehicle speed range despite the driving torque from the second electric motor is increased.

The controller may be programmed to gradually decrease the driving torque from the second electric motor when the vehicle speed is included within the low speed range and the electric vehicle is decelerated while the driving torque is output from the second electric motor. Thus, the vehicle speed is decreased so as to be shifted out of the low speed range, such that the occurrence and the continuation of the resonance is suppressed while decreasing discomfort to the occupant of the electric vehicle due to the change in the feeling of deceleration.

The electric vehicle may further includes a braking device that generates a braking force. The controller may be programmed to increase the braking force from the braking device when the vehicle speed is included within the low speed range and the electric vehicle is decelerated while the driving torque is output from the second electric motor and a brake pedal is depressed by a driver. This favorably suppresses the vehicle speed from remaining in the low vehicle speed range despite the driving torque from the second electric motor is decreased.

The electric vehicle may further includes an engine, and a transaxle coupled to an output shaft of the engine, the first electric motor and the wheel. The second electric motor may output the driving torque to either the wheel or another wheel different from the wheel. In this electric vehicle, the occurrence and the continuation of the resonance is suppressed so as to decrease rattle noise in a gear train and the like included in the transaxle.

A method of the present disclosure is a control method of an electric vehicle that includes a first electric motor and a second electric motor, the first electric motor co-rotating with a wheel when the electric vehicle is driven by only a driving torque from the second electric motor. The method includes increasing or decreasing the driving torque from the second electric motor in accordance with a driving state of the electric vehicle so as to shift a vehicle speed out of a predetermined low speed range when the electric vehicle is driven by only the driving torque from the second electric motor and the vehicle speed is included within the low speed range.

According to the method, the appearance of the resonance and/or the noise due to the cogging torque of the first electric motor that co-rotates with the wheel is favorably suppressed when the electric vehicle is driven by only the driving torque from the second electric motor.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The technique of the present disclosure is applicable to, for example, the manufacturing industry of the electric vehicle.

The invention claimed is:

1. An electric vehicle comprising:
    a first electric motor;
    a second electric motor, the first electric motor co-rotating with a wheel when the electric vehicle is driven by only a driving torque from the second electric motor; and
    a controller programmed to increase or decrease the driving torque from the second electric motor in accordance with a driving state of the electric vehicle so as to shift a vehicle speed out of a predetermined low speed range when the electric vehicle is driven by only the driving torque from the second electric motor and the vehicle speed is included within the low speed range,
    wherein the low speed range is a speed range in which resonance due to a cogging torque of the first electric motor becomes apparent.

2. The electric vehicle according to claim 1, wherein the controller is programmed to gradually increase the driving torque from the second electric motor when the electric vehicle is driven by only the driving torque from the second electric motor without decelerating and the vehicle speed is included within the low speed range.

3. The electric vehicle according to claim 2, further comprising:
    a braking device that generates a braking force,
    wherein the controller is programmed to decrease the braking force from the braking device when the vehicle speed is included within the low speed range and the electric vehicle is driven by only the driving torque from the second electric motor without decelerating while a brake pedal is depressed by a driver.

4. The electric vehicle according to claim 1,
    wherein the controller is programmed to gradually decrease the driving torque from the second electric motor when the vehicle speed is included within the low speed range and the electric vehicle is decelerated while the driving torque is output from the second electric motor.

5. The electric vehicle according to claim 4, further comprising:
    a braking device that generates a braking force,
    wherein the controller is programmed to increase the braking force from the braking device when the vehicle speed is included within the low speed range and the electric vehicle is decelerated while the driving torque is output from the second electric motor and a brake pedal is depressed by a driver.

6. The electric vehicle according to claim 1, further comprising:
    an engine; and
    a transaxle coupled to an output shaft of the engine, the first electric motor and another wheel different from the wheel,
    wherein the second electric motor outputs the driving torque to the wheel.

7. A control method of an electric vehicle that includes a first electric motor and a second electric motor, the first electric motor co-rotating with a wheel when the electric vehicle is driven by only a driving torque from the second electric motor, the method comprising:
    increasing or decreasing the driving torque from the second electric motor in accordance with a driving state of the electric vehicle so as to shift a vehicle speed out of a predetermined low speed range when the electric vehicle is driven by only the driving torque from the second electric motor and the vehicle speed is included within the low speed range,
    wherein the low speed range is a speed range in which resonance due to a cogging torque of the first electric motor becomes apparent.

* * * * *